Oct. 14, 1969  S. M. ELLIS  3,472,084
DRIVING OF DISPLACEABLE MEMBERS
Filed Nov. 13, 1967  2 Sheets-Sheet 1

STAFFORD MALCOLM ELLIS.
INVENTOR

United States Patent Office 3,472,084
Patented Oct. 14, 1969

3,472,084
DRIVING OF DISPLACEABLE MEMBERS
Stafford Malcolm Ellis, Lewisham, London, England, assignor to Elliott Brothers (London) Limited, London, England
Filed Nov. 13, 1967, Ser. No. 682,126
Claims priority, application Great Britain, Nov. 18, 1966, 51,673/66
Int. Cl. F16h 27/02, 29/02; G01l 7/12
U.S. Cl. 74—89    10 Claims

ABSTRACT OF THE DISCLOSURE

Apparatus having a shaft mounted to rotate in bearings and subject to rotating forces which may have components exerting side loads on the bearings wherein the effects of such side loads are minimised by using a coupling member which is rigid as far as turning moments are concerned and flexible as far as side loads are concerned. Particular application for the apparatus is found in aircraft altimeters.

---

Figure 1:
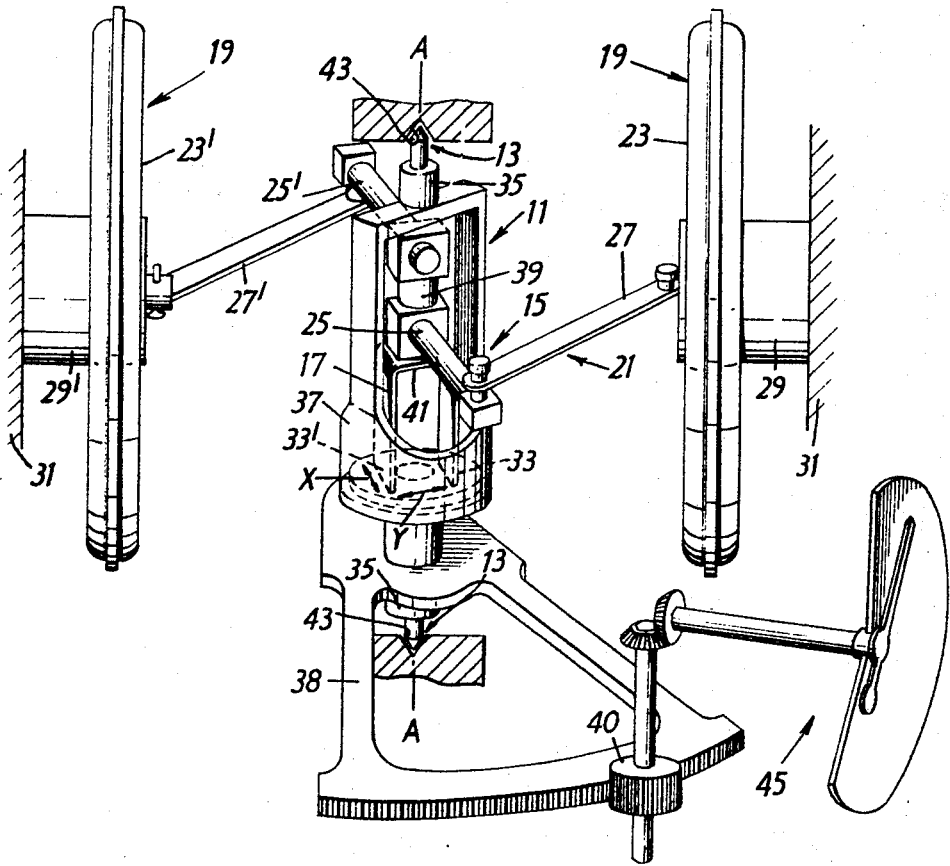

This invention relates to the driving of members, e.g., shafts, which are angularly displaceable about an axis of rotation, and is particularly concerned with the problem of reducing side thrust on an angularly displaceable member so as to avoid excessive friction between the member and bearings by which the member is supported.

It is common practice to provide altimeter units, for use in aircraft, which comprise two nominally similar pressure sensitive capsules; a shaft supported in spaced apart jewelled pivot bearings; two aligned arm portions which extend from the shaft transversely of the shaft axis; and two links respectively pivotally connected to the arm portions and to the capsules. Small rectilinear movements of the capsules, resulting from pressure change, are transmitted by the links and the aligned arms so as to produce a corresponding small angular movement of the shaft.

Besides converting rectilinear movement of the capsules into angular movement of the shaft, unless the characteristics of the of the capsules are identical, the links and arm portions produce an adventitious side thrust on the shaft. Since such side thrust is taken by the bearings and, hence, gives rise to undesirable bearing friction, it is necessary to exercise a careful selection to ensure that capsules to be used in an altimeter are matched to extremely close tolerances. Not only must the capsule characteristics be closely matched but each capsule together with its associated link and arm portion must be independently calibrated.

In consequence of the careful selection of the capsules and the subsequent careful calibration procedures, the avoidance of undesirable side loads exerted by the shaft on the shaft bearings has been time-consuming and expensive.

In accordance with the present invention there is provided an apparatus comprising; a driven member; bearing means adapted to permit angular movement of the driven member about a certain axis and transmission means by way of which the angular movement may be transmitted to the driven member; the transmission means including coupling means which is substantially rigid in one direction perpendicular to the certain axis and flexible in another direction perpendicular to the certain axis; the relative disposition of the driven member and transmission means being such, and the directions of rigidity and flexibility of the coupling means being such that if a force having components in the aforementioned directions is exerted on the coupling means along a line which does not intersect the certain axis, the coupling means is effective, under the action of the component in the direction of rigidity to exert, on the driven member, a moment which produces angular movement of the driven member about the certain axis, and is further effective, under the component acting in the direction of flexibility, to yield resiliently so as to avoid the production of excessive side loads between the driven member and the bearing means.

The invention also extends to such an apparatus in combination with driving means; in such a combination the transmission means includes link means connected to the driving means so that rectilinear movement of the driving means is converted into movement of the coupling means in the direction of rigidity and flexure of the coupling means in the direction of flexibility.

The driving means may comprise first and second driving members; and, in this event, the transmission means may have first and second arm portions extending in the direction of rigidity of the coupling means; and the link means may comprise a first link pivotally connected to the first driving member and the first arm portion, and a second link pivotally connected to the second driving member and the second arm portion.

The driving means may comprise transducer means. The transducer means may comprise pressure transducer means. Where there are two driving members each such member may comprise a pressure sensitive capsule.

The coupling means may comprise leaf spring means. The leaf spring means may comprise a general U-shaped leaf spring which may have an axis of symmetry co-linear with said certain axis. The ends of the U-shaped leaf spring at one end of the U may be secured directly to the driven member. There may be a part secured to the leaf spring means at the other end of the U, namely the cross-member and thereof; and the aforementioned arm portions may extend from said part.

The driven member may comprise two aligned shaft portions connected by a frame portion; and the coupling means may be framed by the frame portion.

The ends of the U-shaped leaf spring may be secured to the frame at a location adjacent to one of the shaft portions.

The bearing means may comprise two spaced apart pivot bearings.

The driven member may be adapted to operate measuring means operative to measure angular rotation of the shaft. The driven member may carry a toothed member adapted to mate with another toothed member so as to drive an angular movement indicator. The driver member may carry the moveable part of an electrical pick-off.

The invention also extends to an instrument which includes apparatus as aforedescribed; and to a transducer unit which is adapted to form part of an aircraft altimeter and which includes such apparatus.

Figure 2:
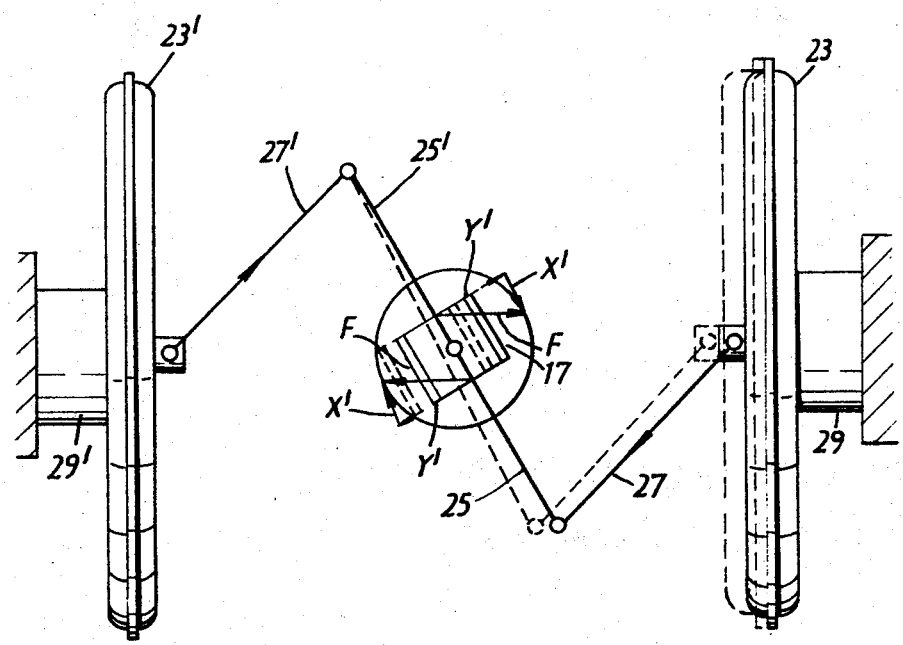

An embodiment of the invention is hereinafter described with reference to the accompanying drawings in which:

FIGURE 1 shows, schematically the working parts of a capsule unit of a pressure transducer of an aircraft altimeter, and FIGURE 2 shows, schematically, the behaviours of the working parts shown in FIGURE 1, as a result of a pressure change.

The capsule unit has (FIGURE 1) a driven member 11, bearing means 13 adapted to permit angular movement of the driven member 11 about a certain axis A; and transmission means 15 by way of which angular movement may be transmitted to the driven member 11.

The transmission means includes coupling means 17 which is substantially rigid in one direction X perpendicular to the certain axis A and flexible in another direction Y perpendicular to the certain axis A.

The relative disposition of the driven member 11 and transmission means 15 is such, and the directions X and R of rigidity and flexibility of the coupling means 17 are such, that if a force having components X', Y' in the two aforementioned directions is exerted on the coupling means 17 along a line which does not intersect the certain axis A, the coupling means 17 is effective, under the action of the component X' in the direction of rigidity to exert, on the driven member 11, a moment which produces angular movement of the driven member 11 about the certain axis A, and, under the component Y' acting in the direction of flexibility, to resiliently yield so as to avoid the production of excessive side loads between the driven member 11 and the bearing means 13.

The capsule unit also comprises driving means 19. The transmission means 15 includes link means 21 connected to the driivng means 19. Rectilinear movement of the driving means 19 is converted into movement of the coupling means 17 in the direction X of rigidity and flexure of the coupling means 17 in the direction Y of flexibility.

The driving means 19 comprises first and second driving members 23 and 23'; the transmission means 15 includes first and second arm portions 25 and 25' which extend in the direction of rigidity X of the coupling means; and the link means 21 comprises a first link member 27 pivotally connected to the driving member 23 and the arm portion 25, and a second link member 27' pivotally connected to the driving member 23' and the arm portion 25'

Each of the driving members 23 and 23' is constituted by pressure transducer means in the form of a pressure sensitive capsule. The links 21 and 21' are respectively pivotally connected to the capsules 23, 23' at the centres of the capsules. The capsules are attached to bosses 29, 29' projecting inwardly from a casing shown, in part, at 31.

The coupling means 17 comprises a generally U-shaped leaf spring which has its ends 33, 33' secured directly to the driven member 11 and which has an axis of symmetry co-linear with axis A.

The driven member comprises two aligned shaft portions 35, 35' connected by a frame portion 37; the U-shaped leaf spring 17 is framed by the frame portion 37.

As shown, the ends 33, 33' of the leaf spring at one end of the U are secured to the frame portion 37 at a location adjacent the shaft portion 35'. The arm portions 25 and 25' extend from a part 39 secured to the cross-member 41 of the leaf spring 17 at the other end of the U.

The bearing means 13 comprises two spaced apart jewelled pivot bearings 43.

The driven member 11 may be adapted to operate indicator means 45 which may be calibrated in terms of altitude; or it may be adapted to operate a pick-off adapted to develop a signal indicative of change of pressure and, hence, of altitude. As shown the driven member 11 carries a toothed member 38 which mates with a toothed member 40.

Assume that the pressure/displacement characteristics of the capsules 23, 23' differ so that for a certain change in atmospheric pressure acting on the capsules, the capsule 23 is displaced to a greater extent than the capsule 23'. The situation is illustrated in FIGURE 2, where the full line positions of the capsules 23, 23' represent the positions which would be taken up by the capsules were their pressure/displacement characteristics identical and the dotted line position of the capsule 23 represents the difference in displacement of the capsule 23 by comparison with capsule 23' due to difference in the capsule characteristics. In practice the difference in displacements of the two capsules is small througout the working pressure range of the capsules.

Such a small difference in capsule characteristics would, nevertheless, produce a large side load and, hence, high friction between the driven member 11 and its bearings 43 were the capsule movements transmitted to the driven member 11 by a transmission composed of rigid members.

With the capsule unit shown in FIGURES 1 and 2, however, any deflection differential between the two capsules gives rise to a force component acting in the direction Y so as to resiliently deflect the leaf spring 17. Since the spring rate of the leaf spring in the Y direction is low, the deflection differential is unable to produce any significant side load between the driven member 11 and its bearings. The turning moment, due to the deflections of the two capsules, on the leaf spring 17, is parallel to the X direction of the leaf spring. The leaf spring is therefore able to transmit angular movement of the leaf spring to the driven member 11.

What I claim is:

1. Apparatus comprising a driven member; bearing means adapted to permit angular movement of the driven member about a certain axis and transmission means by way of which angular movement may be transmitted to the driven member; the transmission means including coupling means which is substantially rigid in one direction perpendicular to the certain axis and flexible in another direction perpendicular to the certain axis; the relative disposition of the driven member and transmission means being such, and the directions of rigidity and flexibility of the coupling means being such that if a force having components in the aforementioned directions is exerted on the coupling means along a line which does not intersect the certain axis, the coupling means is effective, under the action of the component in the direction of rigidity to exert, on the driven member, a moment which produces angular movement of the driven member about the certain axis, and is further effective, under the component acting in the direction of flexibility, to yield resiliently so as to avoid the production of excessive side loads between the driven member and the bearing means.

2. Apparatus as claimed in claim 1 in combination with driving means wherein the transmission means includes link means connected to the driving means so that rectilinear movement of the driving means is converted into movement of the coupling means in the direction of rigidity and flexure of the coupling means in the direction of flexibility.

3. Apparatus as claimed in claim 2 wherein the transmission means has first and second arm portions extending in the direction of rigidity of the coupling means; and the link means comprises a first link pivotally connected to the first driving member and the first arm portion, and a second link pivotally connected to the second driving member and the second arm portion.

4. Apparatus as claimed in claim 3 wherein the driving means comprises pressure transducer means.

5. Apparatus as claimed in claim 4 wherein each of the two driving members comprises a pressure sensitive capsule.

6. Apparatus as claimed in claim 1 wherein the coupling means comprises leaf spring means.

7. Apparatus as claimed in claim 1 wherein the driven member comprises two aligned shaft portions connected by a frame portion, the coupling means being framed by the frame portion.

8. Apparatus comprising a driven member; bearing means adapted to permit angular movement of the driven member about a certain axis and transmission means by way of which angular movement may be transmitted to the driven member; the transmission means including coupling means comprising a generally U-shaped leaf spring which is substantially rigid in one direction perpendicular to the certain axis and flexible in another direction perpendicular to the certain axis; the relative disposition of the driven member and transmission means being such, and the directions of rigidity and flexibility of the coupling means being such that if a force having components in the aforementioned directions is exerted on the coupling means along a line which does not intersect the certain axis, the coupling means is effective, under the action of the component in the direction of rigidity to exert, on the driven member, a moment which produces angular movement of a driven member about the certain axis, and is further effective, under the component acting in the direction of flexibility, to yield resiliently so as to avoid the production of excessive side loads between the driven member and the bearing means.

9. Apparatus as defined in claim 8, wherein the leaf spring has an axis of symmetry co-linear with said certain axis.

10. Apparatus comprising a driven member; bearing means adapted to permit angular movement of the driven member about a certain axis and transmission means by way of which angular movement may be transmitted to the driven member, the driven member comprising two aligned shaft portions connected by a frame portion; the transmission means including coupling means which is substantially rigid in one direction perpendicular to the certain axis and flexible in another direction perpendicular to the certain axis, the coupling means comprising a generally U-shaped leaf spring having an axis of symmetry colinear with said certain axis and secured at one end of the U to the transmission means and at the other end of the U to the frame portion, the coupling means being framed by the frame portion; the relative disposition of the driven member and transmission means being such, and the directions of rigidity and flexibility of the coupling means being such that if a force having components in the aforementioned directions is exerted on the coupling means along a line which does not intersect the certain axis, the coupling means is effective, under the action of the component in the direction of rigidity to exert, on the driven member, a moment which produces angular movement of the driven member about the certain axis, and is further effective, under the component acting in the direction of flexibility, to yield resiliently so as to avoid the production of excessive side loads between the driven member and the bearing means.

References Cited

UNITED STATES PATENTS

| | | | |
|---|---|---|---|
| 2,379,328 | 6/1945 | Weingart | 74—89 |
| 3,132,315 | 5/1964 | Rossire | 73—386 |
| 3,160,006 | 12/1964 | Johanson | 73—386 |

FRED C. MATTERN, JR., Primary Examiner

W. S. RATLIFF, JR., Assistant Examiner

U.S. Cl. X.R.

73—386